(12) United States Patent
Hirono

(10) Patent No.: US 12,095,099 B2
(45) Date of Patent: Sep. 17, 2024

(54) CATALYST LAYER AND METHOD FOR PRODUCING THE SAME

(71) Applicant: TOYOTA JIDOSHA KABUSHIKI KAISHA, Toyota (JP)

(72) Inventor: Shinsuke Hirono, Sunto-gun (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 177 days.

(21) Appl. No.: 17/656,417

(22) Filed: Mar. 24, 2022

(65) Prior Publication Data

US 2022/0311016 A1 Sep. 29, 2022

(30) Foreign Application Priority Data

Mar. 25, 2021 (JP) ................................ 2021-050888

(51) Int. Cl.
*H01M 4/90* (2006.01)
*H01M 4/86* (2006.01)
*H01M 4/88* (2006.01)
*H01M 4/92* (2006.01)

(52) U.S. Cl.
CPC ......... *H01M 4/9083* (2013.01); *H01M 4/861* (2013.01); *H01M 4/8642* (2013.01); *H01M 4/8652* (2013.01); *H01M 4/8657* (2013.01); *H01M 4/8814* (2013.01); *H01M 4/8828* (2013.01); *H01M 4/8882* (2013.01); *H01M 4/926* (2013.01)

(58) Field of Classification Search
None
See application file for complete search history.

(56) References Cited

U.S. PATENT DOCUMENTS

2007/0238007 A1   10/2007   Katagiri et al.

FOREIGN PATENT DOCUMENTS

| CN | 106684395 | * | 5/2017 |
|---|---|---|---|
| JP | 2002358980 A | | 12/2002 |
| JP | 2003173785 A | | 6/2003 |
| JP | 2004087267 A | | 3/2004 |
| JP | 2006294594 A | | 10/2006 |
| JP | 2007265734 A | | 10/2007 |
| JP | 2007273144 A | | 10/2007 |
| JP | 2008-176990 | * | 7/2008 |
| JP | 2017-018909 | * | 1/2017 |

* cited by examiner

*Primary Examiner* — Jonathan Crepeau
(74) *Attorney, Agent, or Firm* — Hunton Andrews Kurth LLP

(57) ABSTRACT

A catalyst layer for a fuel cell, wherein the catalyst layer comprises a catalyst-supporting carbon and an ionomer; wherein, in a particle size distribution obtained by the laser diffraction/scattering method, the catalyst-supporting carbon has at least two aggregate particle size peaks at less than 1 μm and at 1 μm or more; wherein, when a thickness of the catalyst layer is divided into three equal parts, the catalyst layer has a first region on a gas diffusion layer side, a second region in a middle part, and a third region on an electrolyte membrane side; and wherein a void ratio $V_G$ of the first region is 5% or more higher than a void ratio $V_M$ of the third region.

2 Claims, 4 Drawing Sheets

Particle size (μm)

Electrolyte membrane side

I/C=1.1 (Third region)
I/C=0.95 (Second region)
I/C=0.8 (First region)

GDL side

Thickness 0 μm:
Membrane side

Thickness 10 μm:
GDL side

Electrolyte
membrane side

I/C=0.9 (Third region)
I/C=0.9 (Second region)
I/C=0.9 (First region)

GDL side

Thickness 0 μm:
Membrane side

Thickness 10 μm:
GDL side

CATALYST LAYER AND METHOD FOR PRODUCING THE SAME

This application claims priority to Japanese Patent Application No. 2021-050888, filed on Mar. 25, 2021, the disclosure of which is hereby incorporated by reference in its entirety.

The disclosure relates to a catalyst layer and a method for producing the same.

BACKGROUND

A fuel cell (FC) is a power generation device which is composed of a single unit fuel cell (hereinafter, it may be referred to as "cell") or a fuel cell stack composed of stacked unit fuel cells (hereinafter, it may be referred to as "stack") and which generates electrical energy by electrochemical reaction between fuel gas (e.g., hydrogen) and oxidant gas (e.g., oxygen). In many cases, the fuel gas and oxidant gas actually supplied to the fuel cell, are mixtures with gases that do not contribute to oxidation and reduction. Especially, the oxidant gas is often air containing oxygen.

Hereinafter, fuel gas and oxidant gas may be collectively and simply referred to as "reaction gas" or "gas". Also, a single unit fuel cell and a fuel cell stack composed of stacked unit cells may be referred to as "fuel cell".

In general, the unit fuel cell includes a membrane-electrode assembly (MEA). The membrane electrode assembly has a structure such that a catalyst layer and a gas diffusion layer (or GDL, hereinafter it may be simply referred to as "diffusion layer") are sequentially formed on both surfaces of a solid polymer electrolyte membrane (hereinafter, it may be simply referred to as "electrolyte membrane" or "membrane"). Accordingly, the membrane electrode assembly may be referred to as "membrane electrode gas diffusion layer assembly" (MEGA).

As needed, the unit fuel cell includes two separators sandwiching both sides of the membrane electrode gas diffusion layer assembly. In general, the separators have a structure such that a groove is formed as a reaction gas flow path on a surface in contact with the gas diffusion layer. The separators have electronic conductivity and function as a collector of generated electricity.

In the fuel electrode (anode) of the fuel cell, hydrogen ($H_2$) as the fuel gas supplied from the gas flow path and the gas diffusion layer, is protonated by the catalytic action of the catalyst layer, and the protonated hydrogen goes to the oxidant electrode (cathode) through the electrolyte membrane. An electron is generated at the same time, and it passes through an external circuit, does work, and then goes to the cathode. Oxygen ($O_2$) as the oxidant gas supplied to the cathode reacts with protons and electrons in the catalyst layer of the cathode, thereby generating water. The generated water gives appropriate humidity to the electrolyte membrane, and excess water penetrates the gas diffusion layer and then is discharged to the outside of the system.

Various studies have been made on fuel cells configured to be installed and used in fuel cell electric vehicles (hereinafter may be referred to as "vehicle").

For example, Patent Literature 1 discloses a solid electrolyte fuel cell including a cathode layer formed on one side of a solid electrolyte layer and an anode layer formed on the other side of the solid electrolyte layer.

Patent Literature 2 discloses a fuel cell including a catalyst electrode which has a high effective utilization rate of a platinum catalyst and which is easy to manufacture.

Patent Literature 3 discloses a solid electrolyte fuel cell directed to increase power generation efficiency by enhancing the performance of a current collector.

Patent Literature 4 discloses a method for forming a catalyst layer for a solid polymer fuel cell having a microstructure with good ion conductivity, gas permeability and electron conductivity.

Patent Literature 1: Japanese Patent Application Laid-Open (JP-A) No. 2007-273144
Patent Literature 2: JP-A No. 2007-265734
Patent Literature 3: JP-A No. 2002-358980
Patent Literature 4: JP-A No. 2003-173785

For the purpose of increasing the power generation performance of a fuel cell, it is necessary to satisfy all of the diffusion of oxygen, the formation of a proton conduction path, and the discharge of produced water in a cathode reaction. If many voids are formed for better gas diffusion and water discharge, the proton conduction path is blocked and the power generation performance is deteriorated. On the other hand, if the number of voids is decreased or the amount of an ionomer is excessively increased to secure proton conductivity, the gas diffusivity and water discharge are deteriorated, and the power generation performance is not increased.

In Patent Literature 1, a catalyst layer having a low void ratio is formed on an electrolyte membrane side, and a catalyst layer having a high void ratio is formed on a gas diffusion layer side. This arrangement is desirable for increasing the power generation performance; however, it results in complicated processes since the two cathode catalyst layers having different void ratios are separately formed. In addition, since the catalyst layers are formed separately, detachment is likely to occur during power generation of the fuel cell at their interfaces, and there is a possibility of a decrease in the power generation performance of the fuel cell.

SUMMARY

The disclosed embodiments were achieved in light of the above circumstances. An object of the disclosed embodiments is to provide a catalyst layer configured to increase the power generation performance of a fuel cell.

In a first embodiment, there is provided a catalyst layer for a fuel cell,
wherein the fuel cell comprises an electrolyte membrane, the catalyst layer and a gas diffusion layer in this order;
wherein the catalyst layer comprises a catalyst-supporting carbon and an ionomer;
wherein, in a particle size distribution obtained by the laser diffraction/scattering method, the catalyst-supporting carbon has at least two aggregate particle size peaks at less than 1 μm and at 1 μm or more;
wherein, when a thickness of the catalyst layer is divided into three equal parts, the catalyst layer has a first region on a gas diffusion layer side, a second region in a middle part, and a third region on an electrolyte membrane side;
wherein a void ratio $V_G$ of the first region is 5% or more higher than a void ratio $V_M$ of the third region; and
wherein a mass ratio (I/C) of the ionomer to the catalyst-supporting carbon of the third region is 0.10 or more higher than a mass ratio (I/C) of the ionomer to the catalyst-supporting carbon of the second region.

The void ratio $V_G$ of the first region may be more than 40% and 44% or less.

The void ratio $V_M$ of the third region may be 34% or more and less than 40%.

The void ratio $V_G$ of the first region may be 8% or more and 10% or less higher than the void ratio $V_M$ of the third region.

The I/C of the third region may be more than 0.90 and 1.30 or less.

The I/C of the second region may be more than 0.90 and 1.00 or less.

The I/C of the third region may be 0.15 or more and 0.35 or less higher than the I/C of the second region.

The fuel cell of the disclosed embodiments comprises the catalyst layer.

The catalyst layer production method of the disclosed embodiments is a method for producing a catalyst layer for a fuel cell,
wherein the fuel cell comprises an electrolyte membrane, the catalyst layer, and a gas diffusion layer in this order;
wherein the method comprises:
preparing a catalyst layer mixture comprising a catalyst-supporting carbon and an ionomer (a catalyst layer mixture preparing step),
preparing a catalyst ink by mixing the catalyst layer mixture and a solvent (a catalyst ink preparing step),
applying the catalyst ink to a transfer sheet (a catalyst ink applying step), and
drying the catalyst ink in a drying time of less than one minute and then removing the solvent to form a catalyst layer (a drying step);
and
wherein, in a particle size distribution obtained by the laser diffraction/scattering method, the catalyst-supporting carbon has at least two aggregate particle size peaks at less than 1 µm and at 1 µm or more.

A solid content of the catalyst ink may be 5% by mass or more and 15% by mass or less.

In the drying, the catalyst ink drying time may be three seconds or more and less than one minute.

In the drying, the catalyst ink may be dried at a wind speed of 10 m/s or more and 30 m/s or less.

In the drying, the catalyst ink may be dried at a temperature of 100° C. or more and 130° C. or less.

According to the catalyst layer of the disclosed embodiments, the power generation performance of a fuel cell can be increased.

BRIEF DESCRIPTION OF THE DRAWINGS

In the accompanying drawings.

DETAILED DESCRIPTION

1. Catalyst Layer

The catalyst layer of the disclosed embodiments is a catalyst layer for a fuel cell,
wherein the fuel cell comprises an electrolyte membrane, the catalyst layer and a gas diffusion layer in this order;
wherein the catalyst layer comprises a catalyst-supporting carbon and an ionomer;
wherein, in a particle size distribution obtained by the laser diffraction/scattering method, the catalyst-supporting carbon has at least two aggregate particle size peaks at less than 1 µm and at 1 µm or more;
wherein, when the thickness of the catalyst layer is divided into three equal parts, the catalyst layer has a first region on a gas diffusion layer side, a second region in the middle part, and a third region on an electrolyte membrane side;
wherein the void ratio $V_G$ of the first region is 5% or more higher than the void ratio $V_M$ of the third region; and
wherein the mass ratio (I/C) of the ionomer to the catalyst-supporting carbon of the third region is 0.10 or more higher than the mass ratio (I/C) of the ionomer to the catalyst-supporting carbon of the second region.

Figure 1:
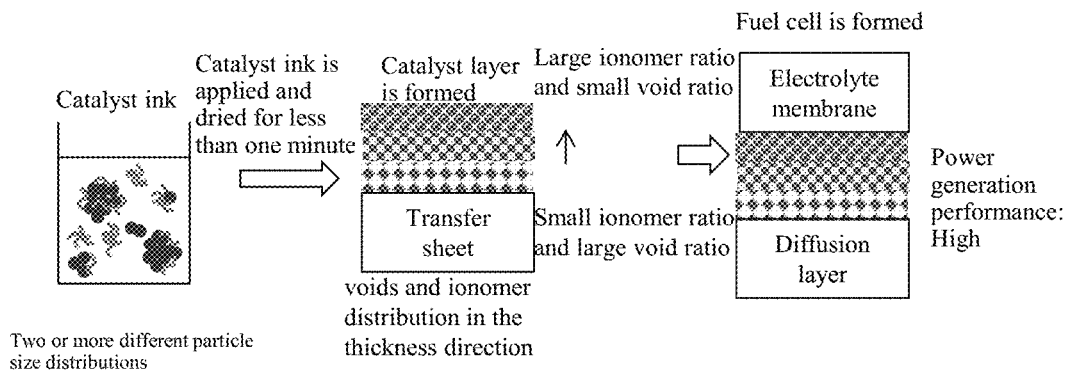
FIG. 1 is a schematic configuration diagram of an example of the catalyst layer production method of the disclosed embodiments.

FIG. 1 is a schematic configuration diagram of an example of the catalyst layer production method of the disclosed embodiments.

Figure 2:
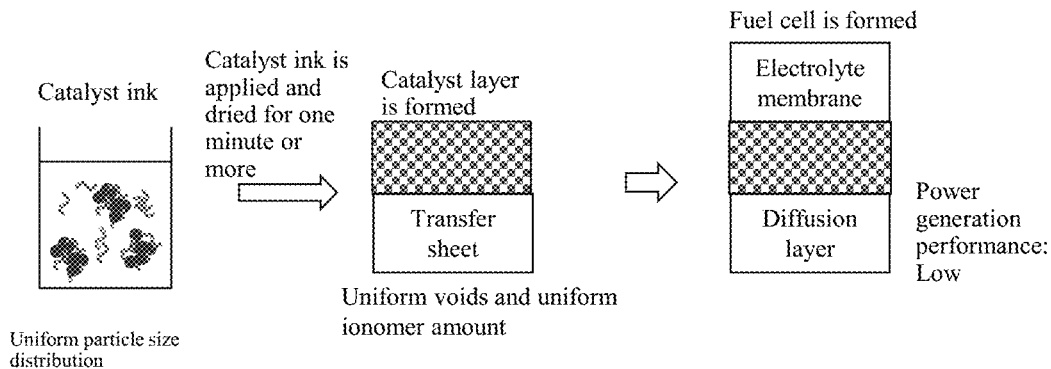
FIG. 2 is a schematic configuration diagram of an example of a conventional catalyst layer production method.

FIG. 2 is a schematic configuration diagram of an example of a conventional catalyst layer production method.

As shown in FIG. 2, in the conventional catalyst layer production method, a catalyst ink containing a catalyst-supporting carbon having one aggregate particle size peak is used, and the solvent contained in the catalyst ink is dried in a drying time of one minute or more. Accordingly, there is no difference in the void ratio and the ionomer ratio between the electrolyte membrane side and diffusion layer side of the catalyst layer.

In the disclosed embodiments, the catalyst layer is made to have a monolithic structure and to have a low void ratio on the electrolyte membrane side and a high void ratio on the gas diffusion layer side. More specifically, the catalyst-supporting carbon and the ionomer, which are members of the catalyst layer, are inclined in the thickness direction of the catalyst layer by controlling the production method.

As shown in FIG. 1, according to the disclosed embodiments, a catalyst ink containing a catalyst-supporting carbon having two or more aggregate particle size peaks is used; the catalyst ink is applied to a transfer sheet; the solvent is dried at high speed in a drying time of less than one minute; and then the dried ink is transferred onto an electrolyte membrane, thereby increasing voids in the thickness direction of the catalyst layer on the diffusion layer side, and disposing the ionomer on the electrolyte membrane side so that the ionomer amount gradually increases. By applying the catalyst layer thus produced to the membrane electrode assembly of the fuel cell, the proton resistance can be decreased without increasing the gas diffusion resistance, and the power generation performance of the fuel cell can be increased in a wide temperature range.

The catalyst layer of the disclosed embodiments is a catalyst layer for fuel cells. The catalyst layer of the disclosed embodiments may be a cathode catalyst layer or an anode catalyst layer. In other words, the catalyst layer of the disclosed embodiments may be at least one selected from the group consisting of a cathode catalyst layer and an anode catalyst layer. Both the cathode catalyst layer and the anode catalyst layer may be the catalyst layer of the disclosed embodiments. The catalyst layer of the disclosed embodiments may be at least a cathode catalyst layer, from the viewpoint of further increasing the power generation performance of the fuel cell.

When the thickness of the catalyst layer is divided into three equal parts, the catalyst layer has the first region on the gas diffusion layer side, the second region in the middle part, and the third region on the electrolyte membrane side. That is, when the catalyst layer is divided into three equal parts perpendicular to the thickness direction, the catalyst layer may have the first region on the gas diffusion layer side, the second region in the middle part, and the third region on the electrolyte membrane side.

The thickness of the catalyst layer is not particularly limited, and it may be from 3 μm to 1000 μm.

The void ratio $V_G$ of the first region on the gas diffusion layer side may be 5% or more higher than the void ratio $V_M$ of the third region on the electrolyte membrane side (that is, the void ratio difference $\Delta V$ (=$V_G-V_M$)≥5%). This ensures the gas diffusivity of the catalyst layer. If $\Delta V$ is too large, the voids on the electrolyte membrane side become insufficient, and the water discharge properties and the gas diffusivity deteriorate. Accordingly, the void ratio $V_G$ of the first region may be 8% or more and 10% or less higher than the void ratio $V_M$ of the third region (that is, 10%≥$\Delta V$≥8%).

The void ratio $V_G$ of the first region on the diffusion layer side may be more than 40% and 44% or less.

The void ratio $V_M$ of the third region on the electrolyte membrane side may be 34% or more and less than 40%.

The void ratio $V_C$ of the second region in the middle part is not particularly limited, as long as it is higher than the void ratio $V_M$ of the third region on the electrolyte membrane side and lower than the void ratio $V_G$ of the first region on the gas diffusion layer side.

The mass ratio (I/C) of the ionomer to the catalyst-supporting carbon of the third region on the electrolyte membrane side, may be 0.10 or more higher than the mass ratio (I/C) of the ionomer to the catalyst-supporting carbon of the second region in the middle part (that is, the inclination $\Delta I/C$ (=$I/C_{third\ region}-I/C_{second\ region}$)≥0.10. This ensures the proton conductivity of the catalyst layer. If $\Delta I/C$ is too large, the ionomer on the GDL side becomes insufficient, and the proton conductivity deteriorates. Accordingly, the I/C of the third region on the electrolyte membrane side may be 0.15 or more and 0.35 or less higher than the I/C of the second region in the middle part (that is, 0.35 $\Delta I/C$≥0.15).

The I/C of the third region on the electrolyte membrane side may be more than 0.90 and 1.30 or less.

The I/C of the second region in the middle part may be 0.10 or more lower than the I/C of the third region on the electrolyte membrane side, and it may be more than 0.90 and 1.00 or less.

The I/C of the first region on the gas diffusion layer side is not particularly limited, as long as it is smaller than the I/C of the second region in the middle part, and it may be 0.50 or more and less than 1.00.

The catalyst layer contains the catalyst-supporting carbon and the ionomer.

In the particle size distribution obtained by the laser diffraction/scattering method, the catalyst-supporting carbon has at least two aggregate particle size peaks at less than 1 μm and at 1 μm or more. As long as the catalyst-supporting carbon has one aggregate particle size peak at less than 1 μm and one aggregate particle size peak at 1 μm or more, it may have two or more aggregate particle size peaks at less than 1 μm, and it may has two or more aggregate particle size peaks at 1 μm or more.

As the catalyst, for example, platinum (Pt) or an alloy of Pt and another metal (such as Pt alloy mixed with cobalt, nickel or the like) may be used.

The ionomer may be an ionomer with proton conductivity, and it may be a fluorine-based resin or the like. As the fluorine-based resin, for example, a perfluorosulfonic acid-based resin such as Nafion (registered trademark) may be used. The ionomer may be, for example, a perfluorosulfonic acid-based resin such as Nafion (registered trademark).

The carbon serving as the support (i.e., carbon support) may be, for example, a carbonaceous material which is generally commercially available. As the carbonaceous material, examples include, but are not limited to, Ketjen Black (product name, manufactured by Ketjen Black International Company), Vulcan (product name, manufactured by Cabot), Norit (product name, manufactured by Norit), Black Pearls (product name, manufactured by Cabot), Acetylene Black (product name, manufactured by Chevron), carbon nanotubes, carbon nanohorns, carbon nanowalls and carbon nanofibers and carbon alloys.

The carbon support may be in a particulate form. For example, the carbon support may be in the form of particles (carbon support particles).

The average particle diameter of the carbon support particles is not particularly limited. It may be from 10 nm to 10 μm.

In the disclosed embodiments, the average particle diameter of the particles is calculated by a conventional method. An example of the method for calculating the average particle diameter of the particles is as follows. First, for a particle shown in an image taken at an appropriate magnification (e.g., 50,000× to 1,000,000×) with a transmission electron microscope (hereinafter referred to as TEM) or a scanning electron microscope (hereinafter referred to as SEM), the diameter when the particle is regarded as spherical, is calculated. Such a particle diameter calculation by TEM or SEM observation is carried out on 200 to 300 particles of the same type, and the average of the particles is determined as the average particle diameter.

2. Catalyst Layer Production Method

The catalyst layer production method of the disclosed embodiments is a method for producing a catalyst layer for a fuel cell,
wherein the fuel cell comprises an electrolyte membrane, the catalyst layer, and a gas diffusion layer in this order;
wherein the method comprises:

preparing a catalyst layer mixture comprising a catalyst-supporting carbon and an ionomer (a catalyst layer mixture preparing step), preparing a catalyst ink by mixing the catalyst layer mixture and a solvent (a catalyst ink preparing step), applying the catalyst ink to a transfer sheet (a catalyst ink applying step), and drying the catalyst ink in a drying time of less than one minute and then removing the solvent to form a catalyst layer (a drying step);

and wherein, in a particle size distribution obtained by the laser diffraction/scattering method, the catalyst-supporting carbon has at least two aggregate particle size peaks at less than 1 μm and at 1 μm or more.

The catalyst layer production method of the disclosed embodiments includes (1) the catalyst layer mixture preparing step, (2) the catalyst ink preparing step, (3) the catalyst ink applying step and (4) the drying step.

(1) Catalyst Layer Mixture Preparing Step

This is a step of preparing a catalyst layer mixture containing a catalyst-supporting carbon and an ionomer.

The catalyst layer mixture contains the catalyst-supporting carbon and the ionomer.

The catalyst-supporting carbon and the ionomer may be the same as those exemplified above in "1. Catalyst Layer".

(2) Catalyst Ink Preparing Step

This is a step of preparing a catalyst ink by mixing the catalyst layer mixture and a solvent.

The solvent is not particularly limited, and it may be appropriately selected depending on the ionomer used and so on. As the solvent, for example, water, methanol, ethanol, propanol, propylene glycol, N,N-dimethylformamide, N,N-diethylformamide, N,N-dimethylacetamide, or N,N-diethylacetamide may be used. As the solvent, a mixture of two or more kinds of them may be used.

The mixing method is not particularly limited. As the method, examples include, but are not limited to, a homogenizer, a ball mill, a shear mixer and a roll mill. From the viewpoint of increasing dispersibility, a ball mill may be used.

The ball mill is not particularly limited. As the ball mill, examples include, but are not limited to, a planetary ball mill.

The material for the balls of the ball mill is not particularly limited. As the material, examples include, but are not limited to, zirconia and alumina.

The diameter of the balls is not particularly limited. It may be from 0.5 mm to 2 mm.

The plate rotational frequency of the ball mill is not particularly limited. It may be from 300 rpm to 500 rpm.

The rotation time of the ball mill is not particularly limited. It may be 3 hours or more or may be 6 hours or more and may be 100 hours or less.

In the disclosed embodiments, the ball mill is a conventionally known device in which balls and materials are placed in a container and rotated, and it is a concept including a bead mill.

The amount of the ionomer in the catalyst ink may be appropriately set depending on the amount of the catalyst-supporting carbon. The catalyst-supporting carbon and the ionomer may be mixed in a mass ratio from 1:0.5 and 1:1.3.

The solid content of the catalyst ink is not particularly limited, and it may be 5% by mass or more, may be 7% by mass or more, may be 15% by mass or less, and may be 11% by mass or less, and may be 9% by mass or less. By setting the solid content of the catalyst ink within the above range, it is easy to control the inclination ΔI/C within a predetermined range. In addition, by setting the solid content of the catalyst ink within the above range, a spill of the solid content is suppressed in the drying step.

(3) Catalyst Ink Applying Step

This is a step of applying the catalyst ink to a transfer sheet.

The method for applying the catalyst ink is not particularly limited, and a conventionally known method can be employed. As the method for applying the catalyst ink, examples include, but are not limited to, a doctor blades method, a metal mask printing method, an electrostatic coating method, a dip coating method, a spray coating method, a roll coating method, a gravure coating method, and a screen printing method.

As the transfer sheet, one having self-supporting property can be appropriately selected and used. For example, a metal foil such as Cu and Al or a resin such as polytetrafluoroethylene (PTFE) can be used.

(4) Drying Step

This is a step of drying the catalyst ink in a drying time of less than one minute and then removing the solvent to form a catalyst layer.

In the drying step, the catalyst ink drying time may be three seconds or more and less than one minute. By high speed drying in less than one minute per catalyst layer, the solid content is efficiently concentrated on the surface coated with the catalyst ink. As a result of the high speed drying, segregation of the ionomer and (aggregated) fine carbon particles easily occurs on the ink-coated surface side by capillary force between the (aggregated) carbon particles.

In the drying step, the catalyst ink may be dried at a wind speed of 10 m/s or more and 30 m/s or less.

Also in the drying step, the catalyst ink may be dried at a temperature of 100° C. or more and 130° C. or less.

The catalyst layer obtained on the transfer sheet is transferred and attached to the electrolyte membrane, and the gas diffusion layer is attached to the side opposite to the electrolyte membrane, thereby producing the catalyst layer in which the void ratio of the catalyst layer on the gas diffusion layer side is large and the concentration of the ionomer is inclined so that the ionomer concentration on the electrolyte membrane side is high.

3. Fuel Cell

The fuel cell of the disclosed embodiments includes the catalyst layer of the disclosed embodiments. The fuel cell includes at least the electrolyte membrane, the catalyst layer, and the gas diffusion layer in this order. The catalyst layer is a cathode catalyst layer or an anode catalyst layer. The gas diffusion layer is a cathode-side gas diffusion layer when the catalyst layer is a cathode catalyst layer, and it is an anode-side gas diffusion layer when the catalyst layer is an anode catalyst layer.

The fuel cell generally includes a unit fuel cell.

The fuel cell may be a fuel cell composed of only one unit fuel cell, or it may be a fuel cell stack composed of stacked unit fuel cells.

The number of the stacked unit fuel cells is not particularly limited. For example, 2 to several hundred unit fuel cells may be stacked; 2 to 200 unit fuel cells may be stacked; or 2 to 300 unit fuel cells may be stacked.

The fuel cell stack may include an end plate at both stacking-direction ends of each unit fuel cell.

Each unit fuel cell may include a membrane electrode gas diffusion layer assembly. Each unit fuel cell may include first and second separators sandwiching the membrane electrode gas diffusion layer assembly.

The membrane electrode gas diffusion layer assembly includes a first gas diffusion layer, a first catalyst layer, the electrolyte membrane, a second catalyst layer and a second gas diffusion layer in this order.

More specifically, the membrane electrode gas diffusion layer assembly includes the anode-side gas diffusion layer, the anode catalyst layer, the electrolyte membrane, the cathode catalyst layer, and the cathode-side gas diffusion layer in this order.

One of the first and second catalyst layers is the cathode catalyst layer, and the other is the anode catalyst layer. The catalyst layer included in the fuel cell of the disclosed embodiments may be the cathode catalyst layer or the anode catalyst layer. Both the cathode catalyst layer and the anode catalyst layer may be catalyst layers included in the fuel cell of the disclosed embodiments. The catalyst layer included in the fuel cell of the disclosed embodiments may be at least the cathode catalyst layer, from the viewpoint of further increasing the power generation performance of the fuel cell.

The cathode (oxidant electrode) includes the cathode catalyst layer and the cathode-side gas diffusion layer.

The anode (fuel electrode) includes the anode catalyst layer and the anode-side gas diffusion layer.

The first catalyst layer and the second catalyst layer are collectively referred to as "catalyst layer". The cathode catalyst layer and the anode catalyst layer are collectively referred to as "catalyst layer".

One of the first gas diffusion layer and the second gas diffusion layer is the cathode-side gas diffusion layer, and the other is the anode-side gas diffusion layer.

The first gas diffusion layer is the cathode-side gas diffusion layer when the first catalyst layer is the cathode catalyst layer. The first gas diffusion layer is the anode-side gas diffusion layer when the first catalyst layer is the anode catalyst layer.

The second gas diffusion layer is the cathode-side gas diffusion layer when the second catalyst layer is the cathode catalyst layer. The second gas diffusion layer is the anode-side gas diffusion layer when the second catalyst layer is the anode catalyst layer.

The first gas diffusion layer and the second gas diffusion layer are collectively referred to as "gas diffusion layer" or "diffusion layer". The cathode-side gas diffusion layer and the anode-side gas diffusion layer are collectively referred to as "gas diffusion layer" or "diffusion layer".

The gas diffusion layer may be a gas-permeable electroconductive member or the like.

As the electroconductive member, examples include, but are not limited to, a porous carbon material such as carbon cloth and carbon paper, and a porous metal material such as metal mesh and foam metal.

The fuel cell may have a microporous layer (MPL) between the catalyst layer and the gas diffusion layer. The microporous layer may contain a mixture of a water-repellent resin such as PTFE and an electroconductive material such as carbon black.

The electrolyte membrane may be a solid polymer electrolyte membrane. As the solid polymer electrolyte membrane, examples include, but are not limited to, a hydrocarbon electrolyte membrane and a fluorine electrolyte membrane such as a thin, moisture-containing perfluorosulfonic acid membrane. The electrolyte membrane may be a Nafion membrane (manufactured by DuPont Co., Ltd.), for example.

One of the first separator and the second separator is the cathode-side separator, and the other is the anode-side separator.

The first separator is the cathode-side separator when the first catalyst layer is the cathode catalyst layer. The first separator is the anode-side separator when the first catalyst layer is the anode catalyst layer.

The second separator is the cathode-side separator when the second catalyst layer is the cathode catalyst layer. The second separator is the anode-side separator when the second catalyst layer is the anode catalyst layer.

The first separator and the second separator are collectively referred to as "separator". The anode-side separator and the cathode-side separator are collectively referred to as "separator".

The membrane electrode gas diffusion layer assembly is sandwiched by the first separator and the second separator.

The separator may include supply and discharge holes for allowing the reaction gas and the refrigerant to flow in the stacking direction of the unit fuel cells. As the refrigerant, for example, a mixed solution of ethylene glycol and water may be used to prevent freezing at low temperature.

As the supply hole, examples include, but are not limited to, a fuel gas supply hole, an oxidant gas supply hole, and a refrigerant supply hole.

As the discharge hole, examples include, but are not limited to, a fuel gas discharge hole, an oxidant gas discharge hole, and a refrigerant discharge hole.

The separator may include one or more fuel gas supply holes, one or more oxidant gas supply holes, one or more refrigerant supply holes, one or more fuel gas discharge holes, one or more oxidant gas discharge holes, and one or more refrigerant discharge holes.

The separator may include a reactant gas flow path on a surface in contact with the gas diffusion layer. Also, the separator may include a refrigerant flow path for keeping the temperature of the fuel cell constant on the opposite surface to the surface in contact with the gas diffusion layer.

When the separator is the anode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The anode-side separator may include a fuel gas flow path for allowing the fuel gas to flow from the fuel gas supply hole to the fuel gas discharge hole, on the surface in contact with the anode-side gas diffusion layer. The anode-side separator may include a refrigerant flow path for allowing the refrigerant to from the refrigerant supply hole to the refrigerant discharge hole, on the opposite surface to the surface in contact with the anode-side gas diffusion layer.

When the separator is the cathode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The cathode-side separator may include an oxidant gas flow path for allowing the oxidant gas to flow from the oxidant gas supply hole to the oxidant gas discharge hole, on the surface in contact with the cathode-side gas diffusion layer. The cathode-side separator may include a refrigerant flow path for allowing the refrigerant to flow from the refrigerant supply hole to the refrigerant discharge hole, on the opposite surface to the surface in contact with the cathode-side gas diffusion layer.

The separator may be a gas-impermeable electroconductive member or the like. As the electroconductive member, examples include, but are not limited to, gas-impermeable dense carbon obtained by carbon densification, and a metal plate (such as an iron plate, an aluminum plate and a stainless-steel plate) obtained by press-molding. The separator may function as a collector.

The fuel cell stack may include a manifold such as an inlet manifold communicating between the supply holes and an outlet manifold communicating between the discharge holes.

As the inlet manifold, examples include, but are not limited to, an anode inlet manifold, a cathode inlet manifold, and a refrigerant inlet manifold.

As the outlet manifold, examples include, but are not limited to, an anode outlet manifold, a cathode outlet manifold, and a refrigerant outlet manifold.

In the disclosed embodiments, the fuel gas and the oxidant gas are collectively referred to as "reaction gas". The reaction gas supplied to the anode is the fuel gas, and the reaction gas supplied to the cathode is the oxidant gas. The fuel gas is a gas mainly containing hydrogen, and it may be hydrogen. The oxidant gas may be oxygen, air, dry air or the like.

EXAMPLES

Example 1

[Catalyst Layer Mixture Preparing Step]

A catalyst layer mixture containing an ionomer and a catalyst-supporting carbon (in the form of aggregated particles) was prepared.

Figure 3:
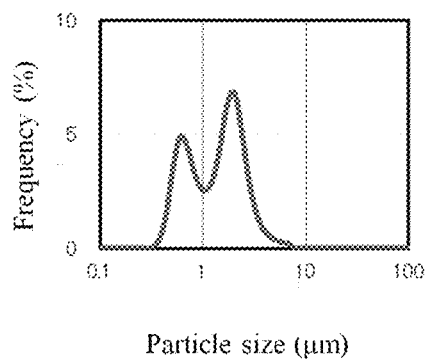
FIG. 3 is a graph showing the particle size distribution of the catalyst-supporting carbon (in the form of aggregated particles) prepared in Example 1, which was obtained by the laser diffraction/scattering method.

FIG. 3 is a graph showing the particle size distribution of the catalyst-supporting carbon (in the form of aggregated particles) prepared in Example 1, which was obtained by the laser diffraction/scattering method.

As shown in FIG. 3, as the catalyst-supporting carbon, a catalyst-supporting carbon having two aggregate particle size peaks at less than 1 μm and at 1 μm or more, was used.

As the ionomer, a perfluorocarbon sulfonic acid resin dispersion (product name: Nafion, manufactured by: DuPont Co., Ltd.) was used.

[Catalyst Ink Preparing Step]

The catalyst layer mixture was added to a solvent containing water and alcohol, and they were mixed together by stirring, thereby preparing a catalyst ink. The solid content of the catalyst ink was 9% by mass.

[Catalyst Ink Applying Step]

A PTFE seat was prepared for transfer. The catalyst ink was applied to the PTFE sheet.

[Drying Step]

The solvent was dried at high speed by blowing hot air at a temperature of 100° C. onto the applied catalyst ink at a wind speed of 10 m/s for 0.3 minutes (18 seconds), thereby obtaining the catalyst layer.

Example 2

A catalyst layer was obtained in the same manner as Example 1, except that in the drying step, the solvent was dried at high speed by blowing hot air at a temperature of 130° C. onto the applied catalyst ink at a wind speed of 20 m/s for 0.2 minutes (12 seconds).

Example 3

A catalyst layer was obtained in the same manner as Example 1, except that in the drying step, the solvent was dried at high speed by blowing hot air at a temperature of 130° C. onto the applied catalyst ink at a wind speed of 30 m/s for 0.05 minutes (3 seconds).

Comparative Example 1

Figure 4:
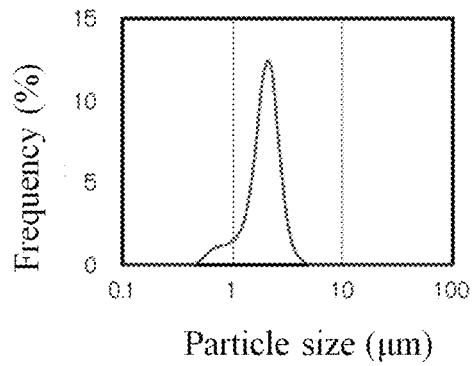
FIG. 4 is a graph showing the particle size distribution of the catalyst-supporting carbon (in the form of aggregated particles) prepared in Comparative Example 1, which was obtained by the laser diffraction/scattering method.

FIG. 4 is a graph showing the particle size distribution of the catalyst-supporting carbon (in the form of aggregated particles) prepared in Comparative Example 1, which was obtained by the laser diffraction/scattering method.

As shown in FIG. 4, as the catalyst-supporting carbon, a catalyst-supporting carbon having one aggregate particle size peak was used in the catalyst layer mixture preparing step.

In the drying step, the solvent was dried by blowing hot air at a temperature of 100° C. onto the applied catalyst ink at a wind speed of 0.1 m/s for two minutes. A catalyst layer was obtained in the same manner as Example 1, except for them.

Comparative Example 2

In the drying step, a catalyst layer was obtained in the same manner as Example 1, except that the solvent was dried by blowing hot air at a temperature of 130° C. onto the applied catalyst ink at a wind speed of 0.1 m/s for one minute.

Comparative Example 3

In the drying step, a catalyst layer was obtained by the same method as in Comparative Example 1, except that the solvent was dried at high speed by blowing hot air at a temperature of 130° C. onto the applied catalyst ink at a wind speed of 20 m/s for 0.2 minutes (12 seconds).

For each of the catalyst layers obtained in Examples 1 to 3 and Comparative Examples 1 to 3, the void ratio $V_G$ of the first region on the gas diffusion layer side and the void ratio $V_M$ of the third region on the electrolyte membrane side when the thickness of each catalyst layer was divided into three equal parts, were measured by TEM image observation of a cross-section of the catalyst layer, and the void ratio difference $\Delta V$ $(=V_G-V_M)$ between them was calculated.

For each of the catalyst layers obtained in Examples 1 to 3 and Comparative Examples 1 to 3, the I/C of the third region on the electrolyte membrane side and the I/C of the second region in the middle part when the thickness of each catalyst layer was divided into three equal parts, were measured by observation of a fluorescence micrograph of a cross-section of the catalyst layer, and the inclination $\Delta$I/C $(=\text{I/C}_{third\ region}-\text{I/C}_{second\ region})$ was calculated.

For each of the catalyst layers obtained in Examples 1 to 3 and Comparative Examples 1 to 3, the proton resistance and the gas diffusion resistance were measured. Results are shown in Table 1.

TABLE 1

| | Membrane-side | GDL-side void | Void ratio | Membrane-side | I/C in the middle | Inclination ΔI/C | Number of | Drying wind speed | Drying | Drying time (min) | Proton resistance | Gas diffusion |
|---|---|---|---|---|---|---|---|---|---|---|---|---|
| Example 1 | 35 | 43 | 8 | 1.1 | 0.95 | 0.15 | 2 | 10 | 100 | 0.3 | 0.4 | 80 |
| Example 2 | 34 | 44 | 10 | 1.25 | 1.0 | 0.25 | 2 | 20 | 130 | 0.2 | 0.3 | 85 |
| Comparative Example 1 | 40 | 40 | 0 | 0.9 | 0.9 | 0 | 1 | 0.1 | 100 | 2.0 | 1.0 | 80 |
| Comparative Example 2 | 40 | 40 | 0 | 0.9 | 0.9 | 0 | 2 | 0.1 | 130 | 1.0 | 1.0 | 80 |
| Comparative Example 3 | 40 | 40 | 0 | 1.1 | 0.9 | 0.2 | 1 | 20 | 130 | 0.2 | 0.3 | 110 |
| Example 3 | 34 | 44 | 10 | 1.30 | 0.95 | 0.35 | 2 | 30 | 130 | 0.05 | 0.9 | 85 |

Figure 5:
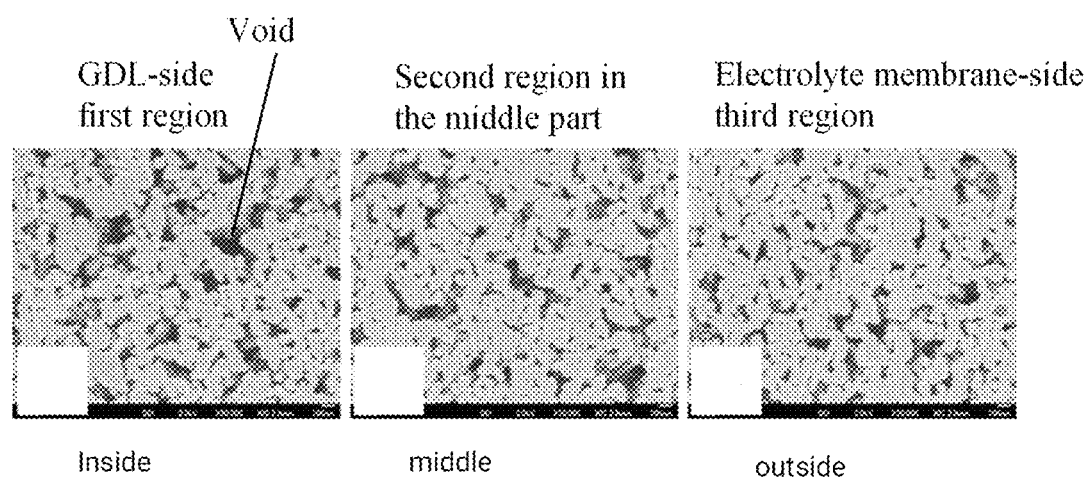
FIG. 5 shows a TEM image of a cross-section of the first region of the catalyst layer of Example 1, which is a region on the gas diffusion layer side of the catalyst layer, a TEM image of a cross-section of the second region of the catalyst layer of Example 1, which is a region in the middle part of the catalyst layer, and a TEM image of a cross-section of the third region of the catalyst layer of Example 1, which is a region on the electrolyte membrane side of the catalyst layer.

FIG. 5 shows a TEM image of a cross-section of the first region of the catalyst layer of Example 1, which is a region on the gas diffusion layer side of the catalyst layer, a TEM image of a cross-section of the second region of the catalyst layer of Example 1, which is a region in the middle part of the catalyst layer, and a TEM image of a cross-section of the third region of the catalyst layer of Example 1, which is a region on the electrolyte membrane side of the catalyst layer. As shown in FIG. 5 and Table 1, in the catalyst layer of Example 1, the void ratio of the first region on the gas diffusion layer side is higher than the void ratio of the third region on the electrolyte membrane side.

Figure 6:
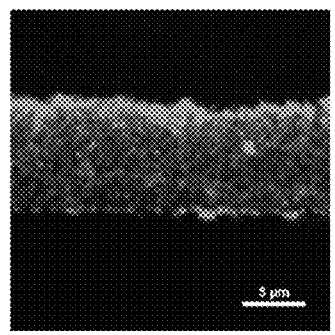
FIG. 6 is a fluorescence micrograph of a cross-section of the catalyst layer of Example 1.

FIG. 6 is a fluorescence micrograph of a cross-section of the catalyst layer of Example 1.

Figure 7:
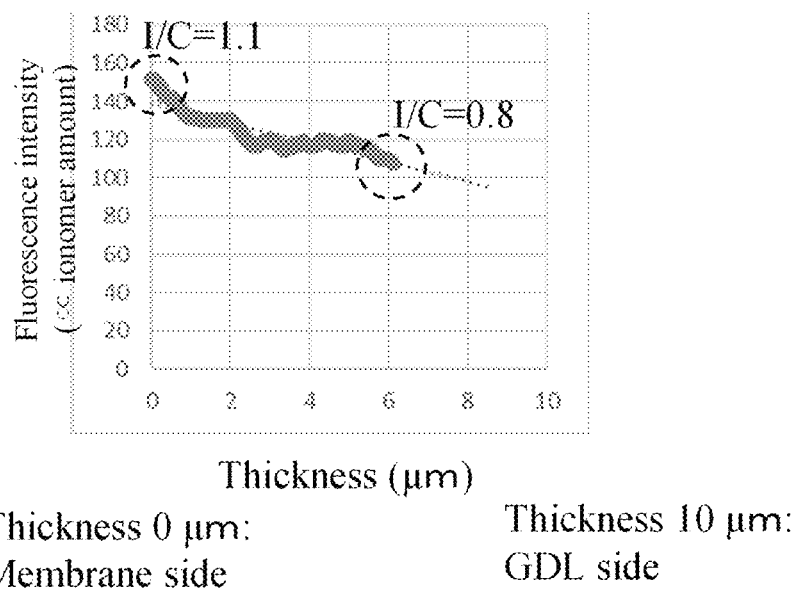
FIG. 7 is a graph showing the relationship between the fluorescence intensity and the thickness of the catalyst layer of Example 1.

FIG. 7 is a graph showing the relationship between the fluorescence intensity and the thickness of the catalyst layer of Example 1. The fluorescence intensity is proportional to the ionomer amount. As shown in FIG. 6, FIG. 7, and Table 1, in the catalyst layer of Example 1, the I/C of the third region on the electrolyte membrane side is higher than the I/C of the second region in the middle part.

Figure 8:
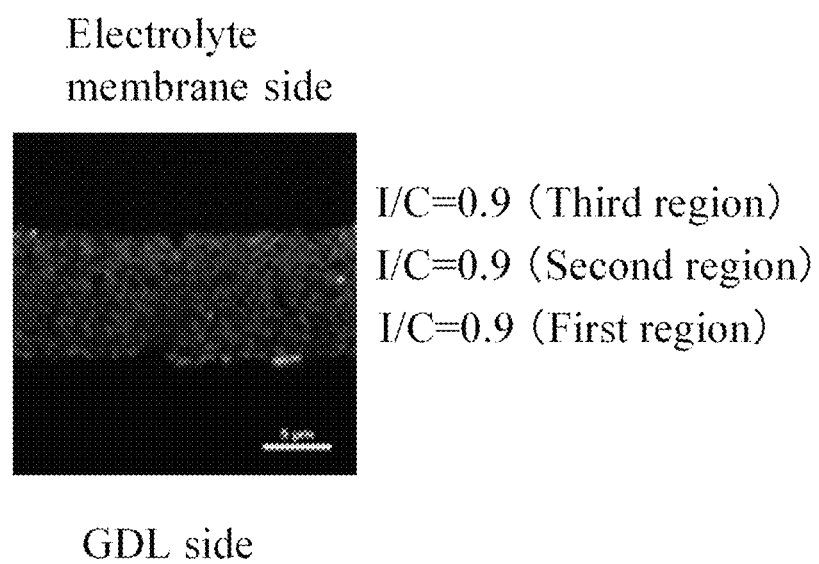
FIG. 8 is a fluorescence micrograph of a cross-section of the catalyst layer of Comparative Example 1.

FIG. 8 is a fluorescence micrograph of a cross-section of the catalyst layer of Comparative Example 1.

Figure 9:
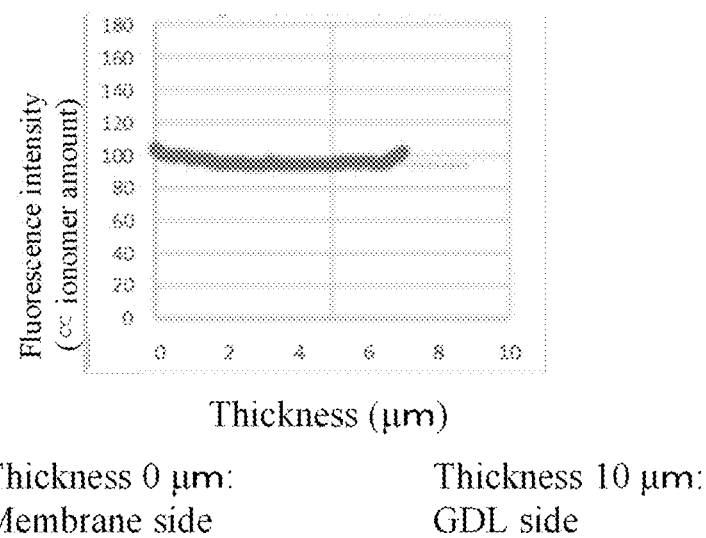
FIG. 9 is a graph showing the relationship between the fluorescence intensity and the thickness of the catalyst layer of Comparative Example 1.

FIG. 9 is a graph showing the relationship between the fluorescence intensity and the thickness of the catalyst layer of Comparative Example 1. As shown in FIG. 8, FIG. 9 and Table 1, for the catalyst layer of Comparative Example 1, the I/C of the third region on the electrolyte membrane side is the same as the I/C of the second region in the middle part.

As shown in Table 1, for the catalyst layers of Comparative Examples 1 to 3, the void ratio of the first region on the gas diffusion layer side is the same as the void ratio of the third region on the electrolyte membrane side, and the I/C of the third region on the electrolyte membrane side is the same as the I/C of the second region in the middle part.

As shown in Table 1, for the catalyst layers of Examples 1 to 3, the void ratio of the first region on the gas diffusion layer side is higher than the void ratio of the third region on the electrolyte membrane side, and the I/C of the third region on the electrolyte membrane side is higher I/C than the I/C of the second region in the middle part.

As shown in Table 1, the proton resistances of the catalyst layers of Examples 1 to 3 are lower than the proton resistances of the catalyst layers of Comparative Examples 1 and 2, and the gas diffusion resistances of the catalyst layers of Examples 1 to 3 are similar to the gas diffusion resistances of the catalyst layers of Comparative Examples 1 and 2.

From the results of Comparative Example 2, it can be seen that the drying time is needed to be less than one minute to decrease the proton resistance.

As shown in Table 1, although the proton resistance of Comparative Example 3 is lower than the proton resistances of the catalyst layers of Comparative Examples 1 and 2, the gas diffusion resistance of Comparative Example 3 is higher than the gas diffusion resistances of the catalyst layers of Comparative Examples 1 and 2.

From the results of Comparative Example 3, it can be seen that the catalyst-supporting carbon having only one aggregate particle size peak is not effective in decreasing the gas diffusion resistance, even if high-speed drying in a drying time of less than one minute is carried out.

What is claimed is:

1. A catalyst layer for a fuel cell,
    wherein the fuel cell comprises an electrolyte membrane, the catalyst layer and a gas diffusion layer in this order;
    wherein the catalyst layer comprises a catalyst-supporting carbon and an ionomer;
    wherein, in a particle size distribution obtained by the laser diffraction/scattering method, the catalyst-supporting carbon has at least two aggregate particle size peaks at less than 1 μm and at 1 μm or more;
    wherein, when a thickness of the catalyst layer is divided into three equal parts, the catalyst layer has a first region on a gas diffusion layer side, a second region in a middle part, and a third region on an electrolyte membrane side;
    wherein a void ratio $V_G$ of the first region is 43% or more and 44% or less;
    wherein a void ratio $V_M$ of the third region is 34% or more and 35% or less;
    wherein a void ratio $V_C$ of the second region is higher than the void ratio $V_M$ and lower than the void ratio $V_G$;
    wherein a mass ratio (I/C) of the ionomer to the catalyst-supporting carbon of the third region is 1.10 or more and 1.30 or less; and
    wherein a mass ratio (I/C) of the ionomer to the catalyst-supporting carbon of the second region is 0.95 or more and 1.00 or less.

2. A fuel cell comprising the catalyst layer defined by claim 1.

* * * * *